(12) United States Patent
Xiao et al.

(10) Patent No.: US 11,671,814 B1
(45) Date of Patent: Jun. 6, 2023

(54) E-911 METHODS AND SYSTEMS FOR DBH HORIZONTAL UNCERTAINTY

(71) Applicant: T-Mobile Innovations LLC, Overland Park, KS (US)

(72) Inventors: Nan Xiao, Mercer Island, WA (US); Muhammad Arshad Khadim, Sammamish, WA (US); Kiong Chong, Bellevue, WA (US); Wei-Ming Lan, Morrisville, NC (US)

(73) Assignee: T-Mobile Innovations LLC, Overland Park, KS (US)

( * ) Notice: Subject to any disclaimer, the term of this patent is extended or adjusted under 35 U.S.C. 154(b) by 133 days.

(21) Appl. No.: 17/477,800

(22) Filed: Sep. 17, 2021

(51) Int. Cl.
*H04W 4/00* (2018.01)
*H04W 4/90* (2018.01)
*H04W 4/029* (2018.01)

(52) U.S. Cl.
CPC .............. *H04W 4/90* (2018.02); *H04W 4/029* (2018.02)

(58) Field of Classification Search
CPC ................................ H04W 4/90; H04W 4/029
See application file for complete search history.

(56) References Cited

U.S. PATENT DOCUMENTS

2020/0244797 A1* 7/2020 Horelik ............... H04L 63/0407
2021/0410100 A1* 12/2021 Balasubramanian ........................ G01S 5/0018

OTHER PUBLICATIONS

"LTE Positioning Protocol (LPP)", Retrieved from: https://www.3gpp.org/ftp/Specs/archive/37_series/37.355/37355-g40.zip, Aug. 16, 2021, 298 pages.

* cited by examiner

*Primary Examiner* — Omoniyi Obayanju
(74) *Attorney, Agent, or Firm* — Shook, Hardy & Bacon L.L.P.

(57) ABSTRACT

In various examples, upon successful transmission of a device-based hybrid (DBH) location from a UE to a cellular network upon that UE placing an Enhanced 911 (E911) call, a horizontal uncertainty associated with the DBH location is taken into account. If that uncertainty reaches a threshold value, alternative location information in the form of one or more of a Cell Identity (CID) or an Enhanced Cell Identity (E-CID) associated with the UE can be used in generating a location report that is then sent to a Public Safety Answering Point. As a result, first responders may be able to more quickly locate distressed E911 callers.

9 Claims, 5 Drawing Sheets

E-911 METHODS AND SYSTEMS FOR DBH HORIZONTAL UNCERTAINTY

BACKGROUND

Enhanced 911 (E911) is a vital part of our nation's emergency response system. Upon a distressed caller placing an emergency call via user equipment (UE), E911 is able to critically provide the estimated physical location of the caller. This physical location is often provided to a Public Safety Answering Point (PSAP), such as an operator who receives 911 calls and dispatches first responders to the scene. E911 is in contrast to traditional 911 services where a caller has to orally provide the operator with location information. In E911, various types of positioning technologies can be used to derive geographical location information for a UE, which can then be provided to a PSAP. For example, location information for a UE can be provided in the form of a Device Based Hybrid ("DBH") location. DBH is a positioning solution that uses a combination of technologies, such as satellite Global Positioning System (GPS) and crowd-sourced Wi-Fi measurements to produce high-accuracy location information. This technology is particularly suited for UEs located indoors.

A horizontal uncertainty value may be associated with location information generated using DBH positional technologies. A horizontal uncertainty value represents an estimate of the amount of potential positional error associated with an estimated location. In particular, horizontal uncertainty is a location parameter that indicates the outer limits of the possible radius of a search area surrounding the estimated location coordinates for a UE, such as the estimated coordinates obtained from a DBH location. Horizontal uncertainty is a distance or region that is expressed in meters and is often expressed as a circle or an ellipse. The lower the horizontal uncertainty, the smaller the potential search area and the higher the likelihood that a caller will be located. In conventional E911 methods and systems, if transmission of a UE's DBH location to a cellular network is successful, the DBH location is used in generating a location report for the UE that is sent to a PSAP unless the horizontal uncertainty value associated with the DBH location is excessively high. An excessively high horizontal uncertainty value for a DBH location may be because Wi-Fi is unavailable for the UE. Even horizontal uncertainty values for DBH locations that are not excessively high, however, can have significant deleterious consequences because they increase the potential area in which a caller may be located, thereby making it more difficult for first responders to quickly find a distressed caller.

SUMMARY

The present disclosure is directed, in part, to E911 methods and systems for use with Device Based Hybrid ("DBH") horizontal uncertainty, substantially as shown in and/or described in connection with at least one of the figures, and as set forth more completely in the claims. In contrast to conventional approaches, upon successful transmission of a UE's DBH location to a cellular network, the horizontal uncertainty value associated with the DBH location is taken into account even if not excessively high. If this uncertainty value reaches a threshold value, alternative location information may be transmitted to a PSAP. For example, in certain embodiments a Cell Identity (CID) and/or an Enhanced Cell Identity (E-CID) associated with the UE can be used. A serving base station for a UE has a CID that has corresponding geographical coordinates. With ECID, the Round Trip Time (RTT) for a signal, namely the time it takes for a signal to be sent from a UE plus the amount of time it takes for acknowledgement that the signal has been received by the base station, and the Angle of Arrival (AoA) of a signal as well as the CID for the UE's serving base station are used to estimate the location of a UE. Typically, a CID has an accuracy range of approximately 1500 meters or 0.9 miles, and an E-CID has an accuracy range of approximately 300-1000 meters or approximately 0.6-0.18 miles. In this way, the potential area in which a caller may be located is reduced, making it more likely that first responders will be able to quickly locate the distressed caller. This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, E911 methods and systems are provided that take into account the uncertainty value associated with a UE's DBH location. In embodiments, after an UE initiates an E911 call, a successful location response is received. The successful location response may include a DBH location for the UE. A threshold value for a horizontal uncertainty for the DBH location may be determined. For example, the threshold value may be approximately 20 kilometers. In this case, location information in the form of geographical coordinates associated with the CID for the UE's serving base station may be used to generate a location report for the UE. Location information associated with an E-CID for the UE may also be used to generate a location report for the UE when the threshold horizontal uncertainty value for a DBH location for a UE reaches approximately 20 kilometers. A location report that includes location information for the UE using a CID or E-CID may then be sent to a PSAP if the horizontal uncertainty for the DBH location reaches the threshold value. In this way, more accurate location information can be provided to a PSAP and hence first responders can locate a distressed caller faster.

In other embodiments, a system in a communication network is provided comprising a processor and one or more computer storage hardware devices. The one or more computer storage hardware devices may store computer-usable instructions that, when used by the processor, cause the processor to receive a successful location response after an UE initiates an E911. The successful location response may include a DBH location for the UE. The one or more computer storage hardware devices may store computer-usable instructions that, when used by the processor, cause the processor to determine a threshold value for a horizontal uncertainty for the DBH location. The threshold value may be approximately 20 kilometers. The one or more computer storage hardware devices may also store computer-usable instructions that, when used by the processor, cause the processor to send a location report to a PSAP. The location report may include location information for the UE using at least one a CID or an E-CID if the uncertainty for the DBH location reaches the threshold value.

In still other embodiments, a computer-readable storage media having stored thereon executable instructions that when executed by a processor of a computing device may control the computing device to perform steps for an E911 method is provided. The steps may include receiving a successful location response after an UE has initiated an E911 call, wherein the successful location response includes a DBH location for the UE. The steps may also include determining a threshold value for a horizontal uncertainty for the DBH location. The threshold value may be approximately 20 kilometers. The steps may further include sending a location report to a PSAP that includes location information for the UE using at least one of a CID or an enhanced E-CID if the uncertainty for the DBH location reaches the threshold value.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
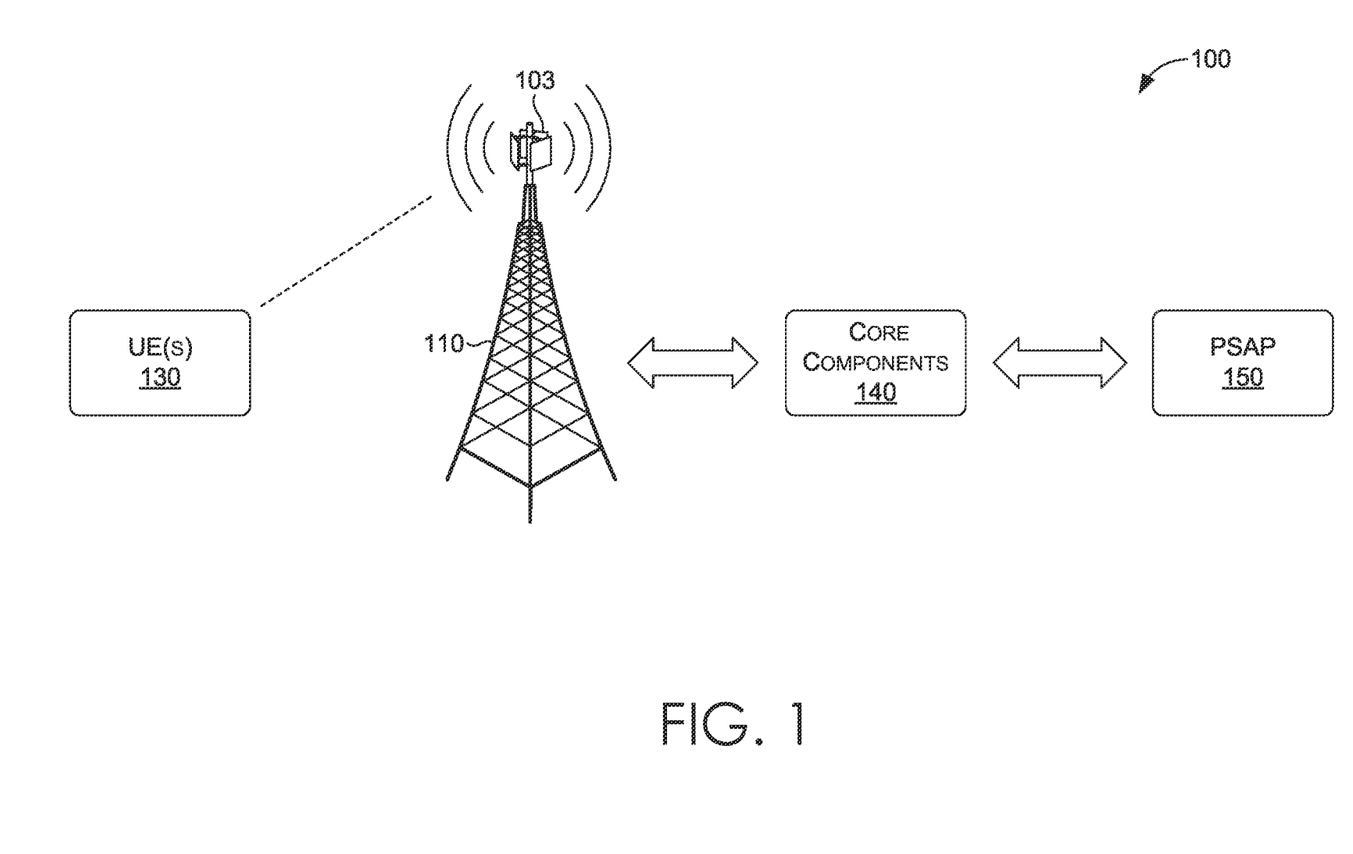
FIG. 1 depicts a high-level example of a network environment in accordance with embodiments of the present disclosure.

FIG. 1 depicts a high-level example of a network environment 100 in accordance with embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 130, such as E911 services. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more user devices 130 and other components, systems, equipment, and/or devices of the network environment 100. The base station and/or a computing device (e.g., whether local or remote) associated with the base station may manage or otherwise control the operations of components of the cell site 110. Network environment 100 may also include core components 140 one or more of which interface with cell site 110 and/or PSAP 150.

In some embodiments, one or more user devices 130 may take the form of one or more wireless or mobile devices capable of communication via the network environment 100. For example, one or more user devices 130 may take the form of one or more mobile devices capable of communication via a telecommunication network such as, but not limited to, a wireless telecommunication network. In this regard, user device 130 may be any mobile computing device that communicates by way of a network, for example, a 3G, CDMA, 4G, LTE, WiMAX, 5G, 6G or any other type of network.

The network environment 100 in certain embodiments may be structured to connect subscribers to a service provider or a plurality of service providers. Alternatively or additionally, the network environment 100 may be associated with a specific telecommunication provider that provides services (e.g. 5G, voice, location, etc.) to one or more user devices 130. For example, the user devices 130 may be subscribers to a telecommunication service provider, in which the user devices are registered or subscribed to receive voice and data services over the network environment 100. The network environment 100 may include any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), 5G, or a 6G network.

Having described network environments 100 and components operating therein, it will be understood by those of ordinary skill in the art that the network environment 100 is but an example of a suitable network and is not intended to limit the scope of use or functionality of aspects described herein. Similarly, network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 is an example, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1 it will be appreciated that some aspects may include a plurality of devices and/or components such that FIG. 1 should not be considered as limiting the quantity of any device and/or component.

Figure 2:
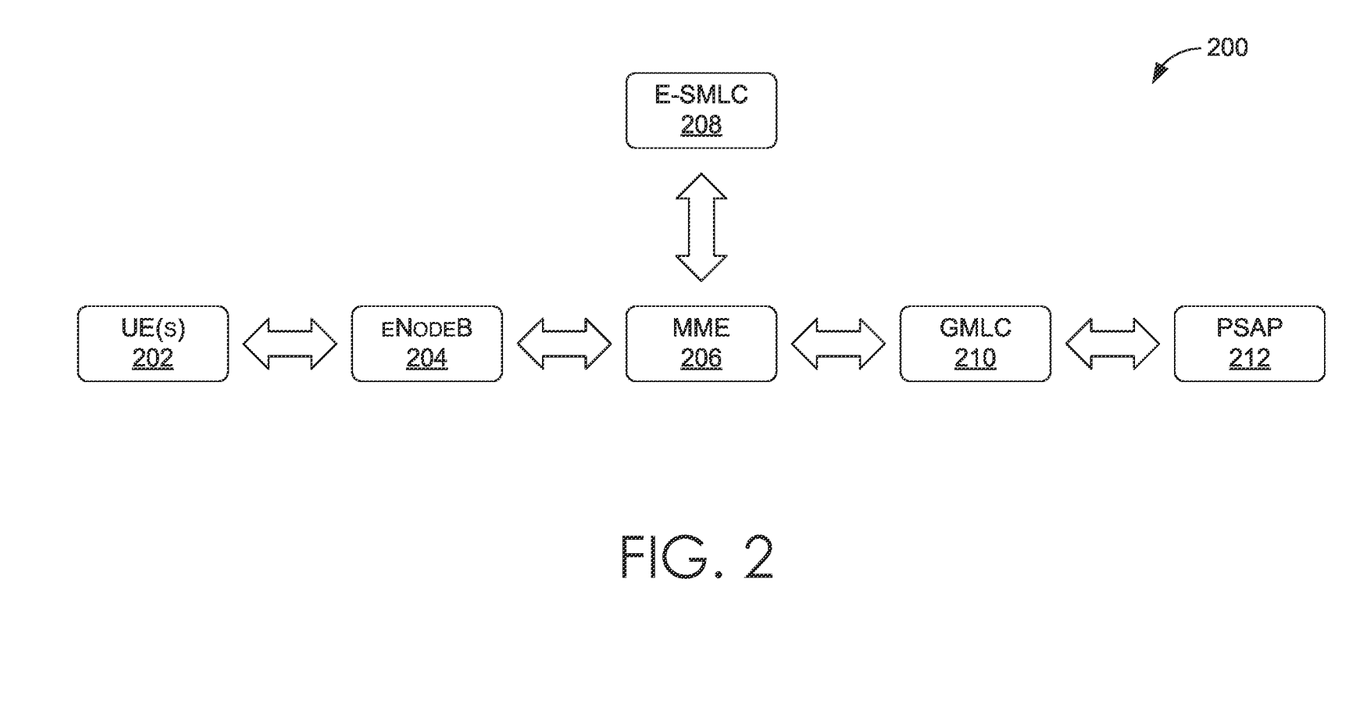
FIG. 2 depicts an example of a 4G network environment in accordance with embodiments of the present disclosure.

FIG. 2 depicts a more detailed example of network environment 100 in accordance with embodiments of the present disclosure. More particularly, FIG. 2 illustrates a 4G network environment 200 in accordance with embodiments of the present disclosure. Network environment 200 may include various 4G core components of a cellular network one or more of which may interface with PSAP 212. Network environment 200 may include one or more UE(s) 202; 4G cell site components, such as eNodeB 204; and 4G core components, such as Mobile Management Entity (MME) 206, Enhanced Serving Mobile Location Center (E-SMLC) 208, and Gateway Mobile Location Center (GMLC) 210.

Figure 3:
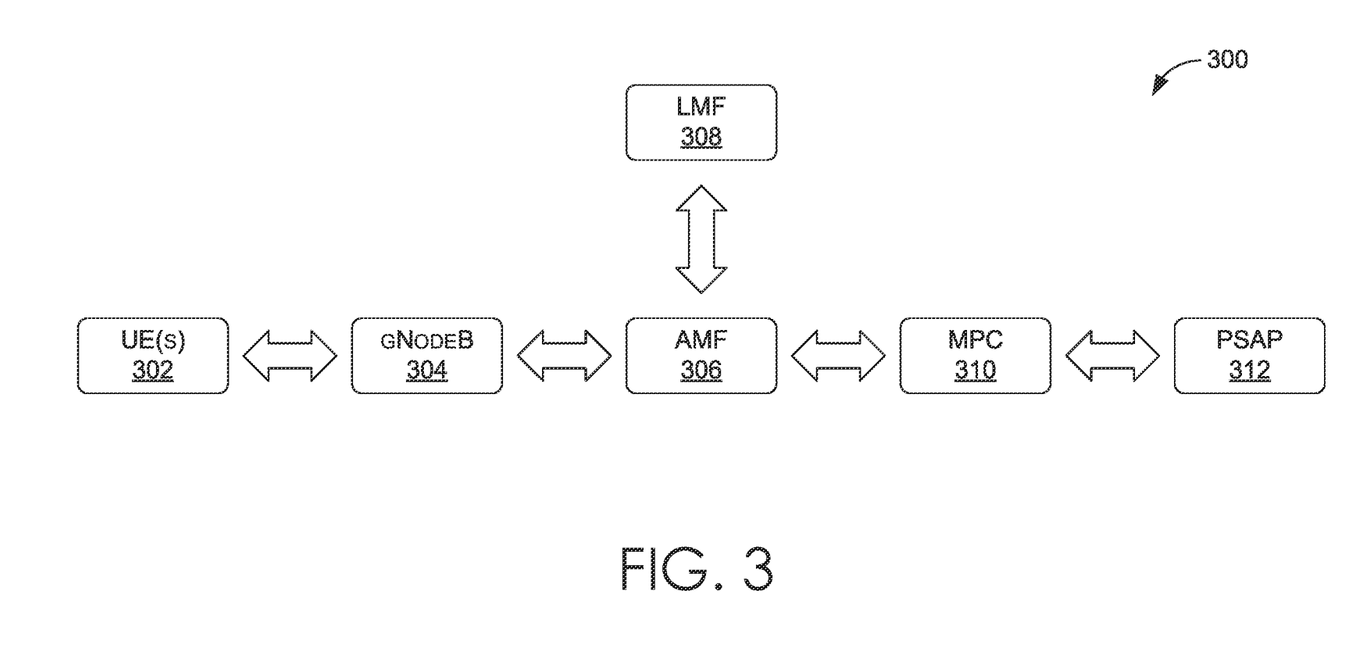
FIG. 3 depicts an example of a 5G network environment in accordance with embodiments of the present disclosure.

FIG. 3 illustrates a more detailed example of network environment 100 in accordance with embodiments of the present disclosure. More particular, FIG. 3 illustrates a 5G network environment 300 in accordance with embodiments of the present disclosures. Network environment 300 may include various 5G core components of a cellular network one or more of which may interface with PSAP 312. Network environment 300 may include one or more UE(s) 302; 5G cell site components, such as gNodeB 304; and 5G core components, such as Access & Mobility Management Function (AMF) 306, Location Management Function (LMF) 308, and Mobile Positioning Center (MPC) 310.

Figure 4:
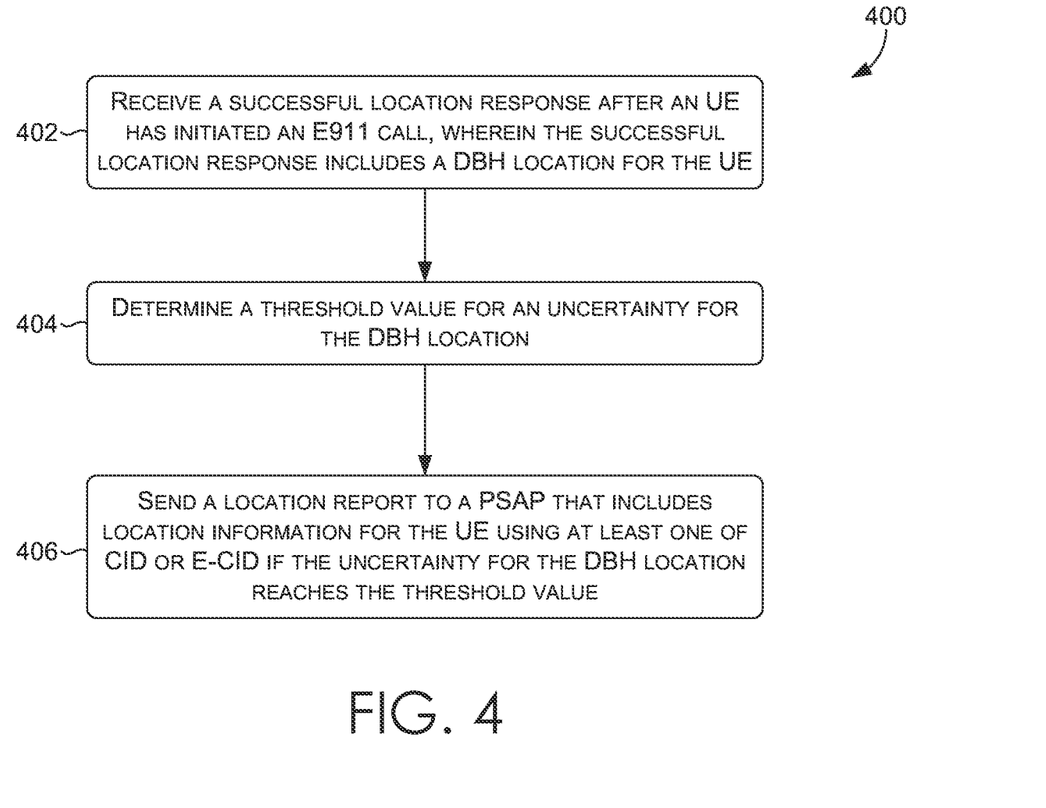
FIG. 4 depicts a call flow of an exemplary E911 method in accordance with embodiments of the present disclosure.

FIG. 4 depicts a flow diagram of an exemplary E911 method 400 in accordance with implementations of the present disclosure. Initially, at block 402, a successful location response may be received after a UE has initiated an E911 call. For example, when a UE user places an emergency call, the UE may send an emergency attach request to the MME in the case of a 4G implementation and to the AMF in the case of a 5G implementation, which is forwarded to the GMLC in the case of a 4G implementation and the MPC in the case of a 5G implementation. The GMLC in the case of a 4G implementation and the MPC in the case of a 5G implementation may send a location request to the MME in the case of the 4G implementation and the AMF in the case of the 5G implementation, which is forwarded to the E-SMLC in the case of the 4G implementation and the LMF in the case of the 5G implementation. In response to the location request, the E-SMLC in the case of the 4G implementation and the LMF in the case of the 5G implementation may communicate with the UE via the MME in the case of the 4G implementation and the AMF in the case of the 5G implementation to obtain location information for the UE. In response, the UE may successfully provide its location information in the form of a DBH location to the E-SMLC in the case of the 4G implementation and the LMF in the case of the 5G implementation via the MME in the case of the 4G implementation and the AMF in the case of the 5G implementation. The DBH location information for the UE may be derived from a mix of location methods including crowd-sourced WiFi, Assisted Global Navigation Satellite System (A-GNSS), and UE-based sensors. In addition, the DBH location information for the UE may include an associated uncertainty estimate reflective of the quality of the estimated location of the UE.

At block 404, a threshold value for a horizontal uncertainty for the DBH location may be determined. For example, in order to provide the PSAP with the most accurate location information for a distressed 911 caller, the E-SMLC in the case of the 4G implementation and the LMF in the case of the 5G implementation may determine a horizontal threshold uncertainty value for the DBH location for the UE and decide whether or not to use the DBH location in a location report sent to a PSAP based on the determined uncertainty value. In embodiments, the threshold uncertainty value may be set to approximately 20 kilometers. This is in contrast to conventional approaches in which a network, upon successful transmission of a DBH location from a UE to the network, sends the DBH location to a PSAP if the horizontal uncertainty value for the DBH location is approximately 20 kilometers or less. In other embodiments, the threshold uncertainty value may be set to approximately 5 kilometers. In still further embodiments, the threshold uncertainty value may bet set to approximately 1 kilometer.

At block 406, a location report may be sent to a PSAP. The location report may include location information for the UE using a CID or an E-CID if the horizontal uncertainty for the DBH location reaches the threshold value. For example, when a DBH location estimate for the UE is returned having a horizontal uncertainty value of approximately 20 kilometers, the E-SMLC and/or the MME in the case of a 4G implementation or the LMF and/or the AMF in the case of a 5G implementation may send a location report to the GMLC in the case of the 4G implementation and the MPC in the case of a 5G implementation using the CID associated with the UE instead of the DBH location. The GMLC in the case of a 4G implementation and the MPC in the case of the 5G implementation may then then send this location report to PSAP. In other embodiments, when the E-SMLC in the case of a 4G implementation or the LMF in the case of the 5G implementation returns a DBH location estimate for the UE having a horizontal uncertainty value at or above approximately 5 kilometers, the E-SMLC and/or MME in the case of a 4G implementation and the LMF and/or AMF in the case of a 5G implementation may send a location report to the GMLC in the case of a 4G implementation and the MPC in the case of a 5G implementation using the CID or E-CID associated with the UE instead of the DBH location. The GMLC in the case of a 4G implementation and the MPC in the case of a 5G implementation may then send the location report to PSAP. In still further embodiments, when the E-SMLC in the case of a 4G implementation or the LMF in the case of a 5G implementation returns a DBH location estimate for the UE having a horizontal uncertainty value at or above approximately 1 kilometer, the E-SMLC and/or MME in the case of a 4G implementation or the LMF and/or AMF in the case of a 5G implementation may send a location report to the GMLC in the case of a 4G implementation and the MPC in the case of a 5G implementation that includes the CID or E-CID associated with the UE instead of the DBH location. The GMLC in the case of a 4G implementation and the MPC in the case of a 5G implementation may then send this location report to the PSAP.

Figure 5:
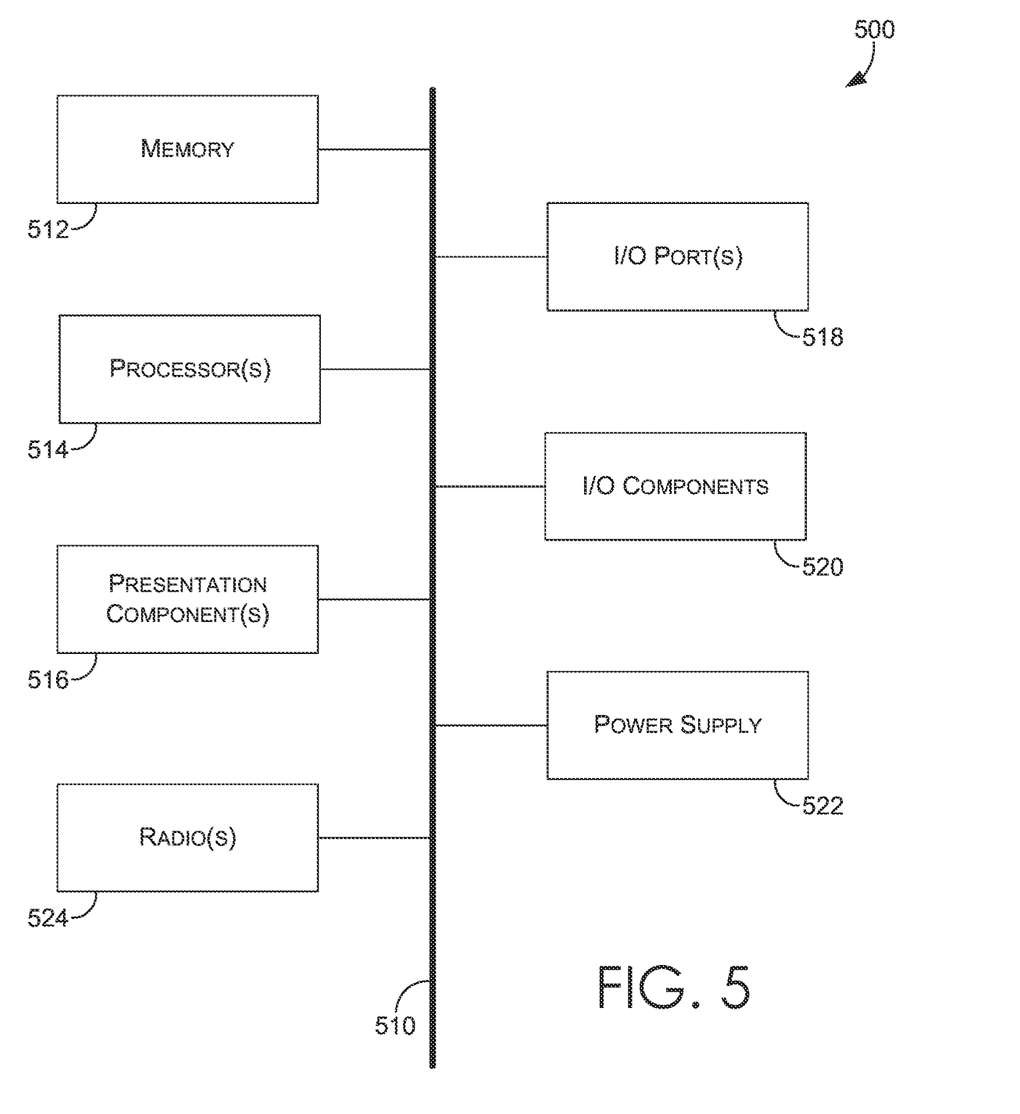
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together. The bus 510 may directly or indirectly one or more of memory 512, processor(s) 514, presentation component(s) 516 (if applicable), radio(s) 524, input/output (I/O) port(s) 518, input/output (I/O) component(s) 520, and/or power supply 522. Although the components of FIG. 5 are shown with lines for the sake of clarity, in reality, delineating various components is not so clear, and metaphorically, the lines would more accurately be grey and fuzzy. For example, one may consider a presentation component(s) 516 such as a display device to be one of I/O components 520. Also, the processor(s) 514 may include memory 512, in another example. The present disclosure hereof recognizes that such is the nature of the art and reiterates that FIG. 5 is merely illustrative of an example of a computing device 500 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database or data store. A database or data store may be any collection of records, files, or information encoded as electronic data and stored in memory 512, for example. In one embodiment, memory 512 may include a set of embodied computer-readable and executable instructions that, when executed, facilitate various functions or elements disclosed herein. These embodied instructions will variously be referred to as "instructions" or an "application" for short.

Processor(s) 514 may be multiple processors that receive instructions and process them accordingly. Presentation component(s) 516, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 524 represents one or more radios that facilitate communication with a wireless telecommunication network. For example, radio(s) 524 may be connected to one or more antenna elements through a physical path. Illustrative wireless telecommunications technologies include CDMA, GPRS, TDMA, GSM, and the like. Radio(s) 524 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 524 may be configured to concurrently support multiple technologies, as previously discussed herein. As such, each of many radio(s) 524 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports 518 may include a USB jack, a stereo jack, an infrared port, a firewire port, other proprietary communications ports, and the like. Input/output (I/O) components 518 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. An Enhanced 911 (E911) method, the method comprising:
    receiving a successful location response after an E911 call has been initiated by a UE, wherein the successful location response includes a device-based hybrid (DBH) location for the UE;
    determining a threshold value for a horizontal uncertainty for the DBH location, wherein the threshold value is approximately 20 kilometers; and
    sending a location report to a Public Safety Answering Point (PSAP) that includes location information for the UE using at least one of a Cell ID (CID) or an enhanced cell ID (E-CID) if the horizontal uncertainty for the DBH location reaches the threshold value.

2. The method of claim 1, wherein the response to the PSAP includes location information for the UE using a CID.

3. The method of claim 1, wherein the response to the PSAP includes location information for the UE using an E-CID.

4. A system in a communication network, the system comprising:
    a processor; and
    one or more computer storage hardware devices storing computer usable instructions that, when used by the processor, cause the processor to:
    receive a successful location response after an E911 call has been initiated by a UE, wherein the successful location response includes a device-based hybrid (DBH) location for the UE;
    determine a threshold value for a horizontal uncertainty for the DBH location, wherein the threshold value is approximately 20 kilometers; and
    send a location report to a Public Safety Answering Point (PSAP) that includes location information for the UE using at least one of a Cell ID (CID) or enhanced cell ID (E-CID) if the horizontal uncertainty for the DBH location reaches the threshold value.

5. The system of claim 4, wherein the response to the PSAP includes location information for the UE using a CID.

6. The system of claim 4, wherein the response to the PSAP includes location information for the UE using an E-CID.

7. Non-transitory computer-readable storage media having stored thereon executable instructions that when executed by a processor of a computing device controls the computing device to perform steps for an Enhanced 911 (E911) method, the steps comprising:
    receiving a successful location response after an E911 call has been initiated by a UE wherein the successful location response includes a device-based hybrid (DBH) location for the UE;
    determining a threshold value for a horizontal uncertainty for the DBH location, wherein the threshold value is approximately 20 kilometers; and
    sending a location report to a Public Safety Answering Point (PSAP) that includes location information for the UE using at least one of a Cell ID (CID) or enhanced cell ID (E-CID) if the horizontal uncertainty for the DBH location reaches the threshold value.

8. The non-transitory computer-readable storage media of claim 7, wherein the response to the PSAP includes location information for the UE using a CID.

9. The non-transitory computer-readable storage media of claim 7, wherein the response to the PSAP includes location information for the UE using an E-CID.

* * * * *